(12) United States Patent
Long (10) Patent No.: US 6,353,429 B1
(45) Date of Patent: Mar. 5, 2002

(54) DETENTED OPTICAL ENCODER

(75) Inventor: Clare Long, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/451,476

(22) Filed: Nov. 30, 1999

(51) Int. Cl.[7] .................................................. G09G 5/08
(52) U.S. Cl. ........................ 345/158; 345/163; 345/164; 345/165; 345/166; 345/167
(58) Field of Search ................................ 345/158, 163, 345/164, 165, 166, 167

(56) References Cited

U.S. PATENT DOCUMENTS

| | | | | |
|---|---|---|---|---|
| 5,808,568 A | * | 9/1998 | Wu .............................. | 341/20 |
| 5,912,661 A | * | 6/1999 | Siddiqui ...................... | 345/166 |
| 6,014,130 A | * | 1/2000 | Yung-Chou ................. | 345/163 |
| 6,157,369 A | * | 12/2000 | Merminod et al. ......... | 345/157 |

* cited by examiner

Primary Examiner—Bipin Shalwala
Assistant Examiner—Jimmy H. Nguyen
(74) Attorney, Agent, or Firm—Ronald M. Anderson (57) ABSTRACT

A detented encoder, employed for sensing a rotation of a wheel by a user between detent position, and suited for use in a pointing device or other user input device. The detented encoder includes a light emitter, a pair of photodetectors, and a codewheel. Interruption of light emitted by the light emitter and received by the photodetectors is processed by a logic circuit to produce a quadrature signal indicative of the detent position of the wheel. The codewheel is integral to a shaft that is supported at one end by a support bracket connected to the lower case of the device. The wheel rotates the shaft when turned by a user. The shaft includes a plurality of evenly-spaced, longitudinally extending spline teeth. A biasing member or opto spacer is operatively coupled to the lower case and includes a base portion on which the light emitter and photodetector are mounted. The biasing member includes a cantilever portion. A U-shaped slot in the cantilever portion includes a protrusion that engages the spline teeth on the shaft. The protrusion is biased against the splined portion of the shaft, so that as the shaft is rotated, the protrusion moves in and out of spline wells defined between adjacent spline teeth, thereby creating a detent action. The detented encoder also includes a microswitch that is activated by the shaft when a user depresses the wheel. A logic device processes the signal produced by the photodetector to determine the transitions between the detent positions as the wheel is turned.

20 Claims, 11 Drawing Sheets

| CHA | CHB | STATE |
|-----|-----|-------|
| 1 | 0 | 1 |
| 1 | 1 | 2 |
| 0 | 1 | 3 |
| 0 | 0 | 4 |

| OLD QUAD | CURRENT STATE | NEW QUAD | NEW STATE | OUTPUT ON CHANGE |
|----------|---------------|----------|-----------|------------------|
| 10 | 1 | 11 | 2 | + |
| 11 | 2 | 01 | 3 | + |
| 01 | 3 | 00 | 4 | + |
| 00 | 4 | 10 | 1 | + |
| 10 | 1 | 00 | 4 | - |
| 11 | 2 | 10 | 1 | - |
| 01 | 3 | 11 | 2 | - |
| 00 | 4 | 01 | 3 | - |

| OLD QUAD | CURRENT STATE | NEW QUAD | NEW STATE | OUTPUT ON CHANGE |
|---|---|---|---|---|
| 00 | 1 | 01 | 2 | + |
| 01 | 2 | 11 | 3 |  |
| 11 | 3 | 10 | 4 | + |
| 10 | 4 | 00 | 1 |  |
| 00 | 1 | 10 | 4 |  |
| 10 | 4 | 11 | 3 | - |
| 11 | 3 | 01 | 2 |  |
| 01 | 2 | 01 | 1 | - |

DETENTED OPTICAL ENCODER

FIELD OF THE INVENTION

The present invention generally concerns an input device, and in particular, an input device that enables a user to manipulate a cursor or other graphic object, make selections, and control a computer.

BACKGROUND OF THE INVENTION

Pointing devices, such as computer mice and trackballs, are used to provide user input to a computer program and are well known in the art. Such pointing devices enable a user to easily move a cursor on a display screen, and are fundamental to programs and operating systems that employ a graphical user interface, such as the Microsoft Corporation's WINDOWS™ and Apple Corporation's MACINTOSH™ operating systems. In a typical pointing device, a ball is rotated in the housing of the device, either directly by the user's fingers, or by movement of the device over a surface. Depending upon its direction of rotation, the rotating ball in turn causes one or both of a pair of encoder shafts in the housing to rotate. The encoder shafts rotate about a pair of orthogonal axes, i.e., the "X" and "Y" axes in response to the components of the ball's rotation along those axes. As the encoders are rotated, they produce signals that indicate the device's incremental motion along these orthogonal axes; these signals are processed by a driver program executing on a computer, which produces a corresponding stream of digital values indicative of a position of the device relative to the X and Y axes. The driver program also receives other input signals from the pointing device, including a signal indicative of the state of control buttons on the device. The relative position data and the state of the buttons are input to a computer program (or the operating system), which processes the information, causing a predefined action to occur. For example, many operating systems move a cursor displayed on a monitor or other display screen in response to a user's movement of a pointing device. The X and/or Y movement of the cursor on the display screen is proportional to the motion of the ball (or device) along the respective X and/or Y axes.

In recent years, mouse manufacturers have added a third input axis to their products, commonly known as the "Z" axis. Originally developed by the Microsoft Corporation for use with its WINDOWS™ operating system, this axis on a mouse is primarily used for scrolling within a document or displayed data. The Z-axis control on a mouse is typically implemented as a detented wheel (the Z-wheel), which is coupled to an encoder that monitors rotation of the Z-wheel by a user. Detents on the rotational motion of the wheel enable a user to scroll a document or data display in consistent increments specified by the user, such as a predetermined number of lines/detent, or a screen/detent. The Z-wheel is typically mounted vertically and disposed toward the front of a mouse so that it can be readily turned with a user's finger. The detent positions are typically spaced at increments of about 20 degrees.

In order to obtain a desired level of performance, the output signal produced by the Z-axis encoder should accurately correspond to the number and direction of detent positions that the user rotates the Z-wheel. For example, if a user rotates the Z-wheel through five detent positions in a forward direction (rotating the top of the Z-wheel toward the front of the mouse), this movement should be reflected by the computer program, e.g., by the program scrolling forward in a document displayed on a monitor through five of the scrolling increments previously selected by the user.

Several techniques have been implemented in prior art Z-wheel mice to address this performance requirement. One solution is to use a mechanical encoder with a built-in detent. In this type of device, a mechanical detent is closely coupled with the encoder that produces an electrical output signal, which satisfies the foregoing performance requirement. However, mechanical encoders of this type generally cost more than may be desired. Therefore, a less-expensive optical encoder scheme is preferable for accurately detecting rotation of the Z-wheel through detent positions.

Optical encoders are commonly used to detect motion and/or position of a member. Two classes of optical encoders are incremental encoders, and absolute encoders. There are also two types of optical encoders, including rotary encoders and linear encoders. Incremental rotary encoders are suitable for use in a mouse. Ideally, an incremental encoder produces a pair (two channels) of square wave signals that are approximately 90 degrees out of phase; this type of output signal is commonly referred to as a quadrature output. The quadrature output is processed to determine the amount of rotation of an element (such as a wheel) monitored by the encoder, and the direction of the element's rotation.

Figure 1:
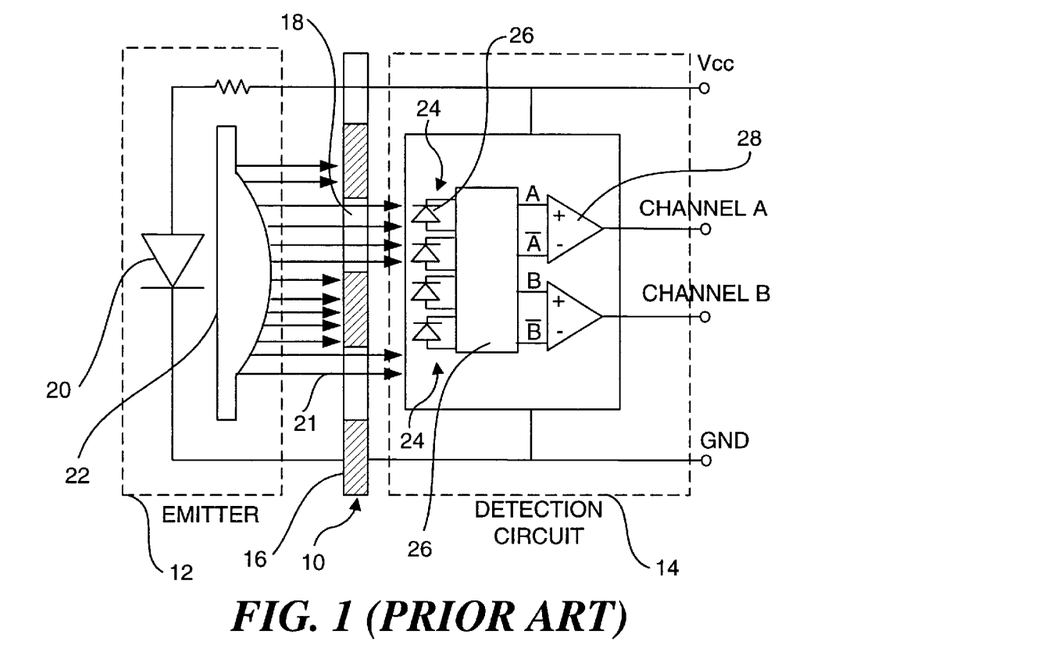
FIG. 1 is a schematic diagram of a conventional prior art optical encoder that incorporates four photodetectors.
Figure 2:
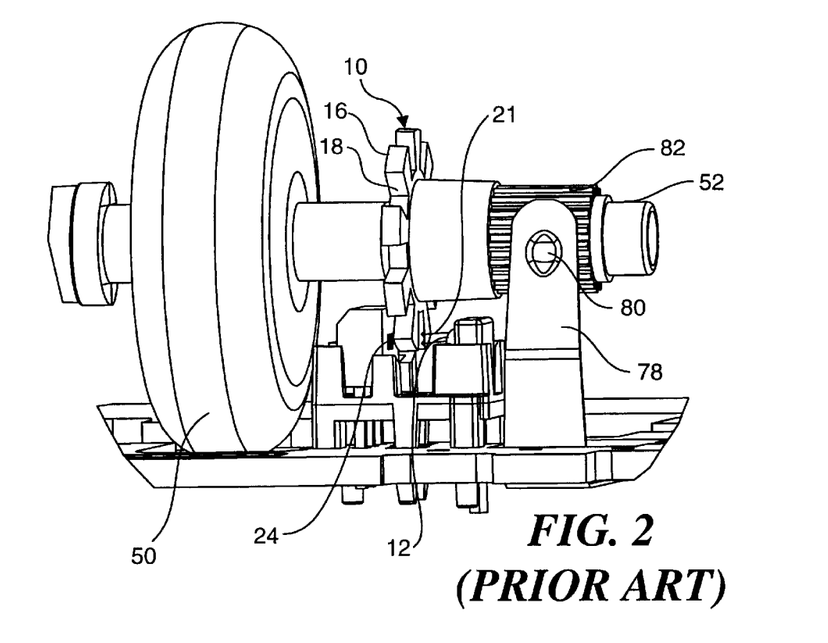
FIG. 2 is an isometric view of an assembly comprising the primary components of a prior art detented optical encoder.

The primary components of a typical optical encoder (prior art) are shown in FIGS. 1 and 2, and include a codewheel or code disk 10, a light emitter 12, and an integrated detection circuit 14. The codewheel generally comprises a plurality of equally-spaced teeth 16, forming slots 18, which may be fully enclosed, or is made from a clear plastic or glass disk imprinted with a radially-spaced pattern of lines, commonly called a "mask." Light emitter 12 typically comprises an LED 20, which emits light rays 21 that are collimated into a parallel beam by a lens 22. Integrated detector circuit 14 is disposed opposite the light emitter and typically comprises at least two photodetectors 24 (as shown in FIG. 2), or two sets of photodetectors (as shown in FIG. 1), noise reduction circuitry 26, and comparators 28. Suitable photodetectors include photodiodes and phototransistors.

The codewheel is disposed relative to the light emitter and integrated detector circuit so that when it is rotated, its slotted or lined portion is between the light emitter and integrated detector circuit. The light beam passing from the light emitter to the integrated detector circuit is thus interrupted by the part of the codewheel between the pattern of slots or by the radial lines on the codewheel. Any portion of the light beam that is not blocked by the codewheel (or the lines that are imprinted) is detected by the photodetectors. The photodetectors typically produce an analog output signal that is proportional to the intensity of light they detect. In general, the output signal produced by each photodetector as the codewheel is turned at a constant rate is sinusoidal. The photodetectors are arranged in a pattern that is a function of the radius and count density of the codewheel, so as to produce a quadrature output.

In the embodiment shown in FIG. 1, the photodetectors are spaced such that a light period on one pair of photodetectors corresponds to a dark period on an adjacent pair of photodetectors, thereby producing two complimentary outputs for each channel. The photodetector outputs are processed by the noise reduction circuitry, which removes extraneous noise. The resulting four signals are then evaluated by the comparators (one comparator for each complimentary pair of signals), which produce a digital waveform corresponding respectively to channels A and B. The digital waveform has voltage levels corresponding to a logic level zero and a logic level one. If the encoder wheel is turned at a constant angular rate, the output signals on channels A and B will be similar to the waveforms shown in FIG. 3C, wherein the digital waveform of channel A is approximately 90 degrees out of phase (in quadrature) with channel B. In actual practice, the waveforms are not perfectly square due to signal propagation delays, switching latencies, etc.— however, the waveforms approximate square waves.

Figure 3A:
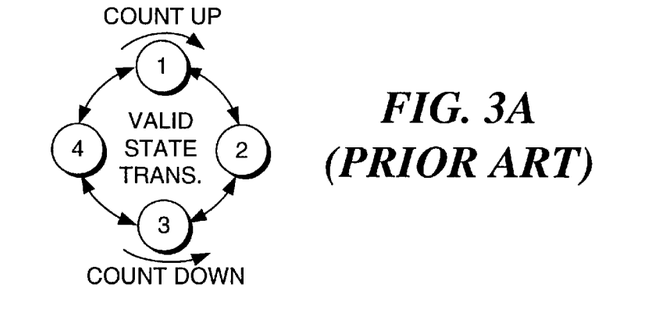
FIGS. 3A and 3B respectively show a state transition diagram and its associated state table corresponding to a conventional full-quadrature encoding scheme.
Figure 3B:
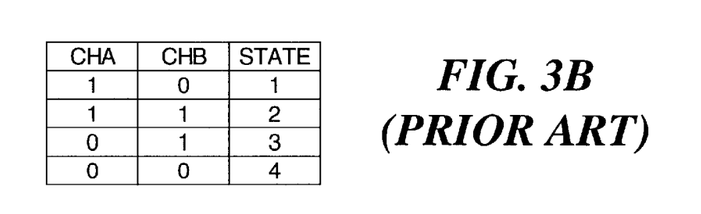
Figure 3C:
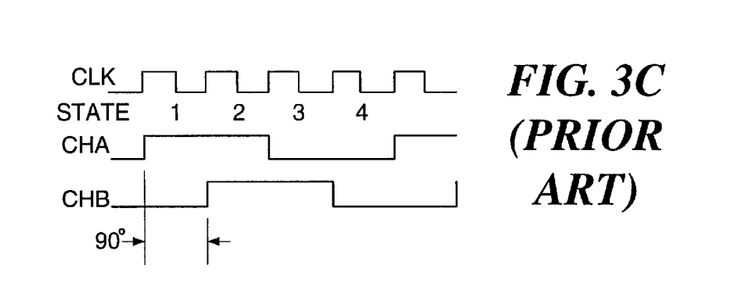
FIG. 3C shows a scheme for evaluating the states of a conventional quadrature signal.

The quadrature output of an encoder can be evaluated to determine the present state of the encoder and the direction that it is being turned or is moving. FIG. 3B shows a typical state table corresponding to a full quadrature encoding scheme, and the corresponding state transitions are shown in FIG. 3A. The state of the encoder is dependent on the logic value of each channel. For example, if the logic values of channels A and B are respectively 1 and 0 (represented simply as "(10)"), the state is 1. By examining changes in the state of the encoder, it is possible to determine the present position of the encoder by integrating its incremental motion. A common scheme used to perform this task is shown in FIG. 3C, wherein the state is evaluated at each falling edge of a clock input signal. The direction of rotation of the encoder wheel can also be determined by determining which channel leads the other, e.g., A leading B indicates clockwise rotation of the wheel; B leading A indicates counterclockwise rotation of the wheel.

Figure 3D:
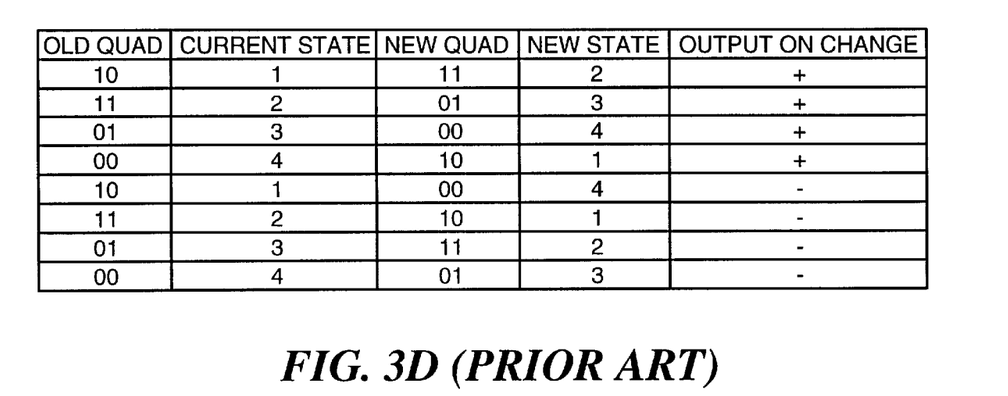
FIG. 3D shows a transition state table corresponding to a conventional 4X quadrature encoding scheme.

FIG. 3D shows a state transition table corresponding to the full quadrature transition states discussed above. The state transition table indicates when a transition is reported based on a sensed change in the position of the encoder wheel. In the case of full quadrature encoding, every change in state on either channel produces either a "+" or "−" change in the output produced by processing the channels. Put another way, there are two state changes for each change in the output signal on a given channel. As a result, this scheme multiplies the resolution of the encoder wheel by four. For an encoder wheel with X teeth, the resolution with which rotation of the wheel can be monitored is 4X. Thus, this type of quadrature encoding is referred to as 4X encoding.

The foregoing optical encoder has several drawbacks when used in a mouse or trackball. A primary problem is that it is too expensive. Each photodiode has a finite cost, and the noise reduction circuitry and comparators also add to the expense of the encoder. Another problem is that the integrated detector circuit portion of the encoder generally takes up too much space. Additionally, the level of precision required for an input axis on a mouse is much lower than the level of precision required in other applications that typically often employ optical encoders of the foregoing design, such as motion controllers, robotics, etc.

Figure 4:
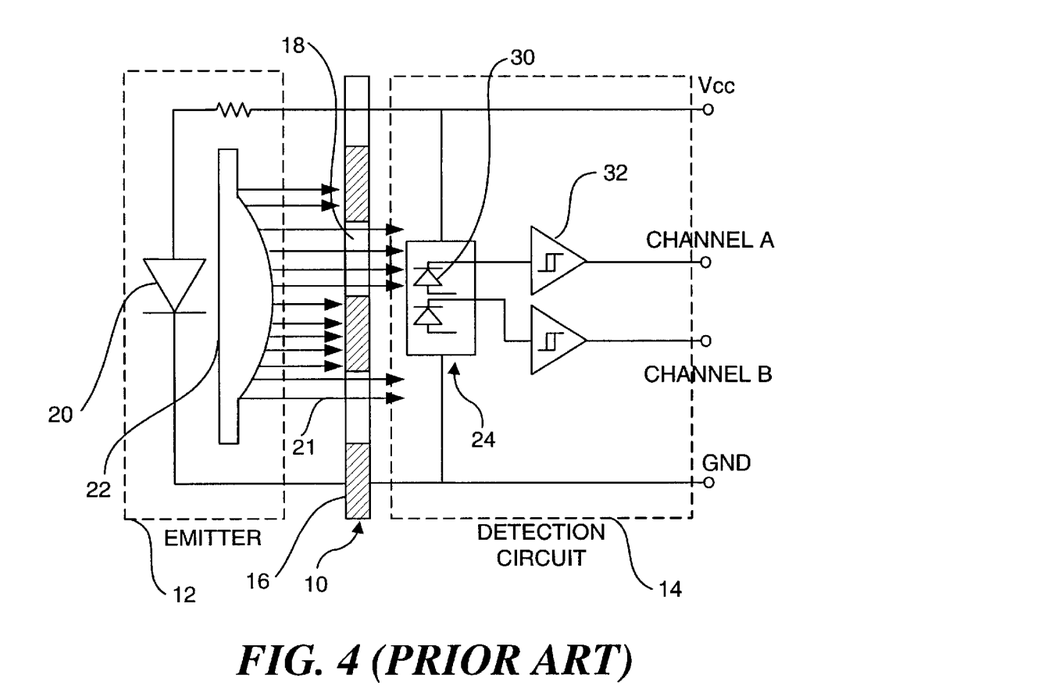
FIG. 4 is a schematic diagram of a low-cost optical encoder suitable for use in the present invention.

In order to address the size and cost limitations of encoders suitable for use in a mouse, an optical encoder scheme has been developed that requires fewer components and is much less costly to manufacture. An example of such a scheme is shown in FIG. 4. As shown therein, the detection circuit has been reduced to a pair of phototransistors 30, each of which produces an analog output signal applied respectively to a non-inverting Schmidt trigger 32. The Schmidt triggers are used to minimize the effects of extraneous noise in the raw signals provided by the phototransistors. Optionally, other types of comparator circuits can be used in place of the Schmidt triggers. The output of the Schmidt triggers is input to a microcontroller, which processes the signals on channels A and B using a special duty-cycle control algorithm to produce a digital waveform in quadrature, which is further processed by a microcontroller to determine the incremental motion imparted to the encoder wheel of the device. Details of the duty-cycle control algorithm, which is discussed briefly below, are disclosed in U.S. Pat. No. 5,256,913, the disclosure and drawings of which are hereby specifically incorporated herein by reference. The output from the microcontroller is passed through a serial communication link to a computer (e.g., through an RS-232 serial port, a universal serial bus port, or a PS/2 port). A driver in the operating system (or in an application program) processes the output from the microcontroller to control the display on the computer screen in response to the movement of the encoder wheel.

Figure 5A:
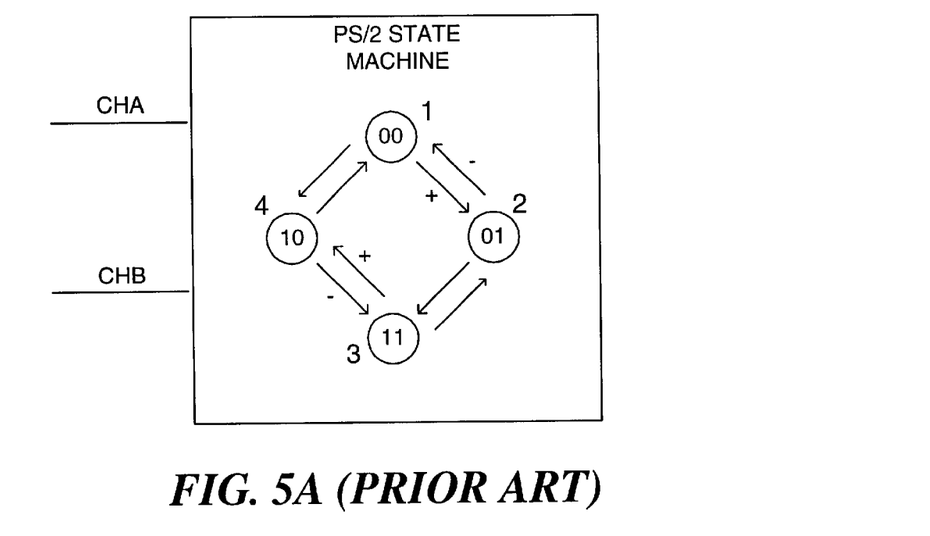
FIG. 5A is a state diagram corresponding to a 2X quadrature encoding scheme used with the optical encoder of FIG. 4.
Figure 5B:
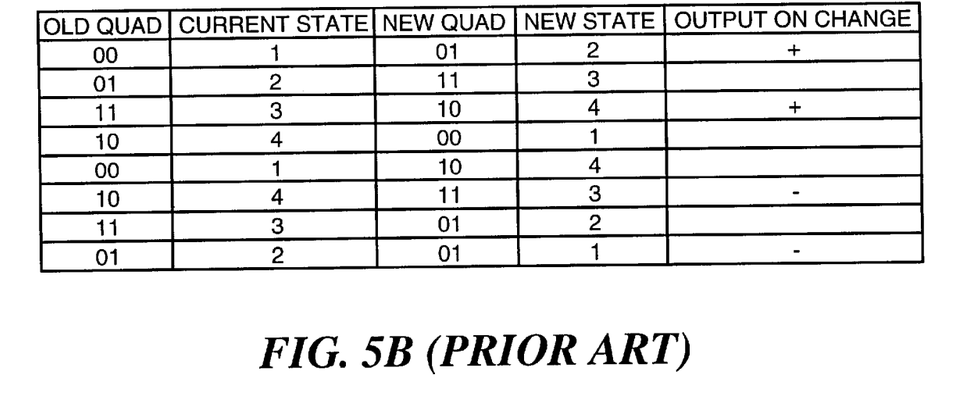
FIG. 5B is a transition state table corresponding to the state diagram of FIG. 5A.

As might be expected, the waveforms produced by the phototransistor/Schmidt trigger/duty-cycle control algorithm scheme are not as accurate and clean as the waveforms produced by the detection circuit of FIG. 1. Due to the lower accuracy of the waveforms, there is a higher probability that a logic level change (a transition between a high and low voltage level) on a channel might be missed, or that a false logic level change might be indicated—either of which would cause the movement of the encoder wheel to be inaccurately reflected in the control action implemented by the computer. To overcome this problem, a new state transition scheme was developed as shown in FIGS. 5A and 5B. In this state transition scheme, there are two electrical state changes required for each detent position of the encoder wheel, which reduces the impact of missed state transitions and false signals, but is still susceptible to several troublesome problems when used with a detented control wheel.

Figure 6:
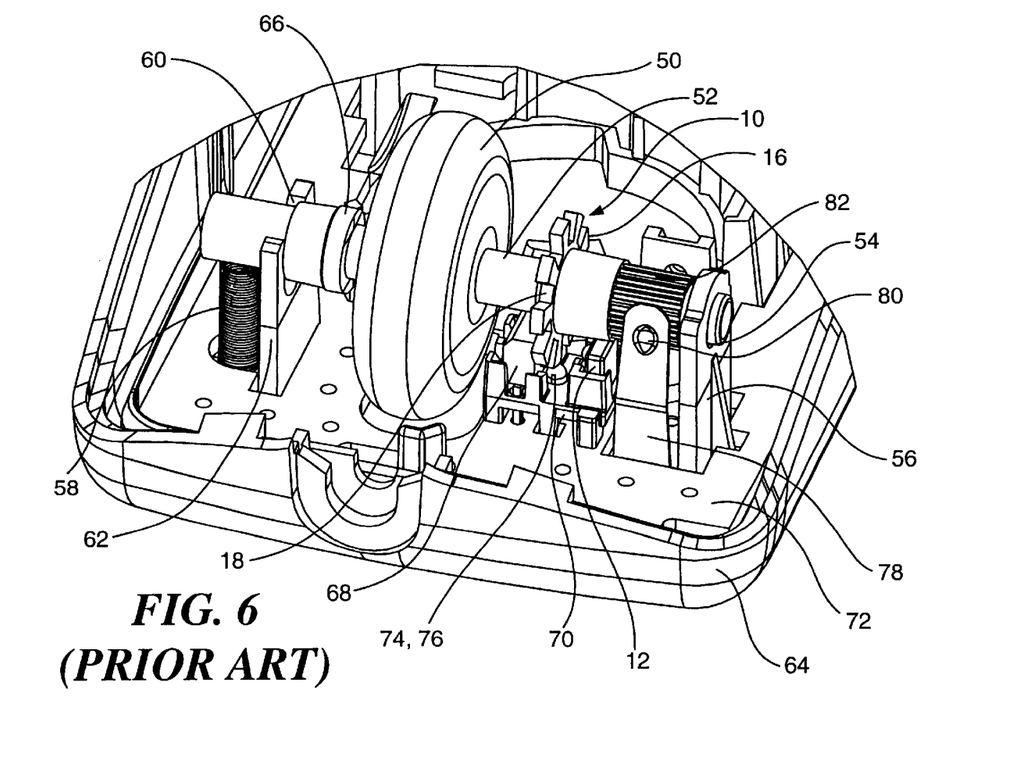
FIG. 6 shows an isometric view of a Z-wheel mouse comprising a prior art detented optical encoder assembly.

A more detailed view of the prior art detented wheel/optical encoder assembly shown in FIG. 2 is illustrated in FIG. 6. The assembly includes a wheel 50 mounted on a shaft 52, which is supported at one end by a bearing 54 in a support bracket 56, and at an opposite (free) end by a metal coil spring 58, which is displaced over a post (not shown). Lateral movement of the shaft is restricted by a slot 60 defined in a slotted bracket 62, through which the shaft extends. Support bracket 56, the spring post, and slotted bracket 62 all extend upwardly from the interior surface of a lower case 64. Coil spring 58 and slot 60 allow the free end of the shaft to pivot in bearing 54 (which is slightly elongated in the vertical direction to allow for such pivoting), permitting the wheel to be vertically displaced when a downward force is applied to it. This vertical displacements enables a collar 66 formed in the shaft to actuate a microswitch (not shown) mounted beneath the collar. The actuation of the microswitch by a user changes a scrolling mode of the display. An upward force provided by coil spring 58 biases the free end of the shaft upwardly away from the microswitch when the downward force on the wheel is removed. Formed as an integral part of the shaft is a codewheel 10, with a plurality of teeth 16 defining slots 18 (shown in FIG. 1), as discussed above. The teeth and slots pass between light emitter 12 and phototransistors 24 (see FIGS. 1 and 2), which are mounted in a detector housing 68. The detector housing and the light emitter are mounted to a common base 70, which clips into a printed circuit board (PCB) 72 and defines a location hole 74 that is used to locate the base relative to an alignment pin 76 extending from the interior surface of the lower case.

The assembly produces a detent action through the use of a metal leaf spring 78, which has a protrusion 80 formed on its upper free end. This protrusion rides against a splined portion 82 of the shaft comprising a plurality of spline teeth separated by spline wells. The lower fixed end of the metal leaf spring is mounted to support bracket 56 (at a point disposed under the PCB). As the shaft is rotated, the protrusion riding on the splined portion of the shaft causes the spring to flex, thereby creating a detent action.

Figure 7:
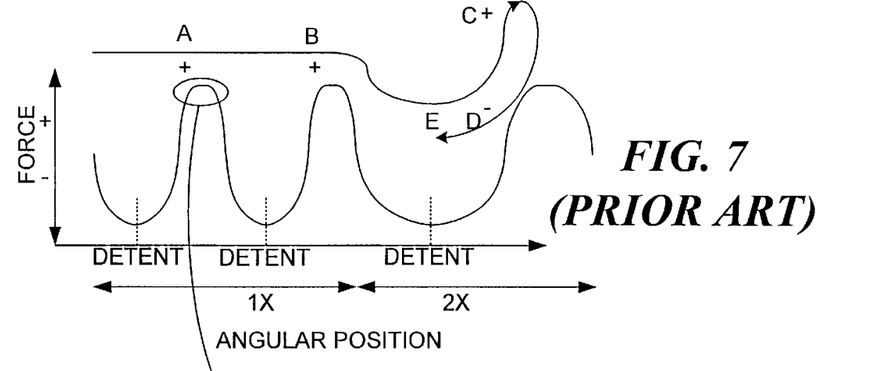
FIG. 7 is a force curve corresponding to a relative level of force vs. angle encountered when turning a detented wheel through a plurality of adjacent detents.
Figure 15:
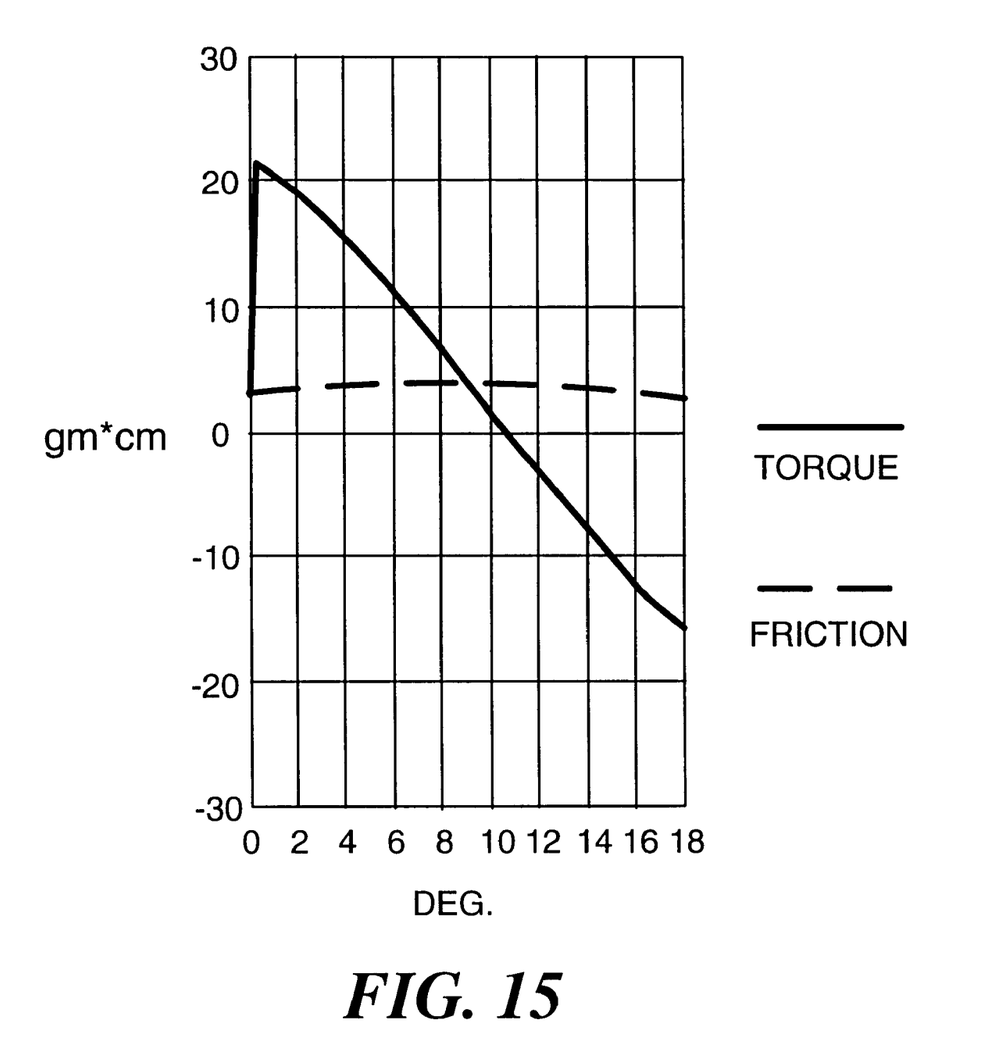
FIG. 15 is a composite torque vs. angle and friction force vs. angle graph corresponding to the torque and friction encountered when rotating the wheel between adjacent detent positions.

The force required to move the wheel from one detent position to the next varies with the angular position of the wheel as it is rotated between the detent positions. FIG. 7 illustrates the relative displacement of the protrusion 80 with respect to the spline teeth as the shaft 52 is rotated. The force the leaf spring exerts on the hub varies linearly with this displacement. As the wheel is rotated, protrusion 80 moves in and out of the spline wells and over the spline teeth, thereby changing the pressure angle (i.e., the angle of the normal surface at the contact point) between the protrusion and a spline tooth. Assume the leaf spring is configured to be displaced in a vertical direction. In general (without considering friction), for a given amount of wheel torque, the vertical component of the force acting on the leaf spring (i.e., causing the leaf spring to flex) is proportional to the vertical component of the pressure angle. As a result, the maximum amount of torque encountered when rotating the wheel between detent positions occurs immediately after leaving a detent position, as shown in FIG. 15. Additionally, as the wheel is further rotated, the torque needed to rotate the wheel will become negative as the protrusion slides over the top of a spline tooth, thereby causing the wheel to move forward into the next detent position as the spring bias force causes the protrusion to slide into the next spline well.

Figure 8:
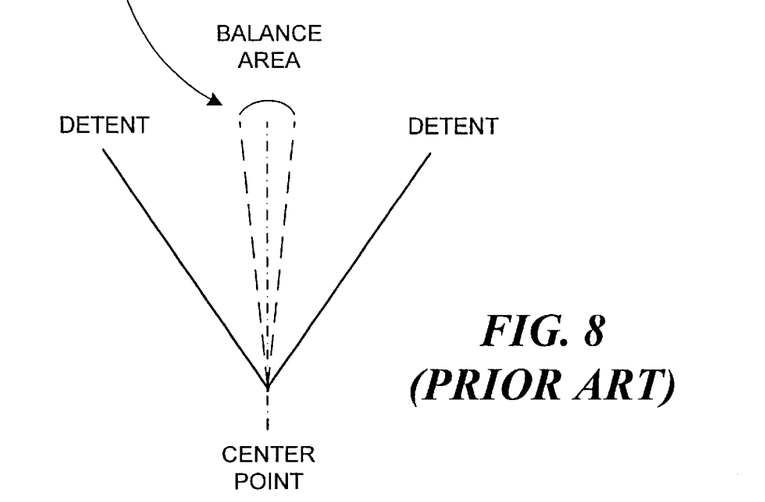
FIG. 8 is a diagram illustrating a balance area that may exist between two adjacent detents.

Under optimal circumstances, there should be a tendency for the wheel to always return to a detent position if a user releases the wheel (stops applying a rotational force to the wheel), regardless of the angular position of the wheel when released. However, as shown in each region enclosed by an ellipse in FIG. 7 and in FIG. 8, there are areas between detent positions, known as balance areas, where the wheel will hang and not return to a detent position if it is released, i.e., if the user stops applying a rotational force to the wheel. (If the wheel is released outside of one these balance areas, the wheel will always move to the nearest detent position, as is desired.) Due to variations in friction caused by non-symmetrical spring geometry, the balance point for rotation of the wheel in a forward direction is not necessarily coincident with the balance point for rotation of the wheel in a reverse direction.

FIG. 7 also illustrates another problem that can be encountered with a detented optical encoder, known as bounce back. Bounce back occurs when a user turns or rolls the wheel forward quickly and then releases the wheel just prior to passing through a balance point to the next detent position. If the wheel has been rolled forward rapidly, it is possible for the wheel to continue rolling for a short duration in its present direction after the user has stopped turning the wheel, due to the angular momentum of the encoder wheel. The wheel will slow down, stop, then return to the previous detent position. If the electrical system senses a transition point prior to the direction of wheel rotation reversing, the result will be that the last electrical count is reported in a direction opposite that in which the user was rolling the encoder wheel. This problem will be more clearly understood from the following explanation.

At position A, the encoder wheel is moving forward and a forward transition is reported, as indicated by a "+." At position B, the encoder wheel is moving forward and a second forward transition is reported. Between positions B and C, the user stops turning the encoder wheel, but the angular momentum causes the encoder wheel to continue rolling forward. At position C, the encoder wheel is rotating forward very slowly, but a forward transition is reported. Just after position C, the encoder wheel stops; it then changes direction, and returns to the previous detent position. However, at position D, the encoder wheel is rotating in the reverse direction, and a transition in the reverse direction is reported. At position E, the encoder wheel comes to rest. As a result of the preceding scenario, an extra forward transition and an extra reverse transition are registered by the encoder, even though the user did not intend the transitions C+ and D− to be registered. These erroneous transition registrations can be quite bothersome, especially if a user is working on a relatively slow computer on which a lag time between the instant when a scrolling request is received and the instant that the display or data actually scrolls is very evident. In such a case, the user is forced to wait for the false forward and reverse transitions to be implemented on the display before continuing to work on the document or data.

Ideally, the reporting of a transition state change indicating a user movement of the wheel to a new detent position (called the transition point) should occur just after passing the balance region. At this point, it is certain that the encoder wheel will move to the next detent position if the user releases (stops turning) the wheel, and bounce back cannot occur. In addition, it is preferable that the reported transition point (i.e., the angle at which the encoder wheel is when a transition is reported) for both a forward and reverse encoder wheel rotation occurs at repeatable positions.

It is not practical to achieve the ideal operation in the prior art encoder wheel design discussed above, due to part and assembly variances commonly associated with the manufacture of large lots of this type of product. For example, a variation of a mere 0.001" in the location of the protrusion on the leaf spring results in a 0.5 (ATAN [0.001/0.117]) degree shift in the transition angle. Other examples of the adverse effect of manufacturing variances include the variation in the distance between the point on the support bracket to which the leaf spring is mounted and the center of bearing 60 in the support bracket, and the variation in the location of the alignment pin relative to the bearing. The variation in the dimensions within reasonably achievable manufacturing tolerances of the various parts comprising the encoder assembly and/or the variation in the assembled position of these parts can add together to cause the angular position of the teeth/slots to be outside the specified tolerance. Thus, the reported transition points will be out of tolerance relative to the detent positions. In order to meet the desired performance requirement, the tolerances on the parts that comprise the prior art assembly would have to be so tight that the cost of fabricating this assembly would be prohibitive.

Figure 9:
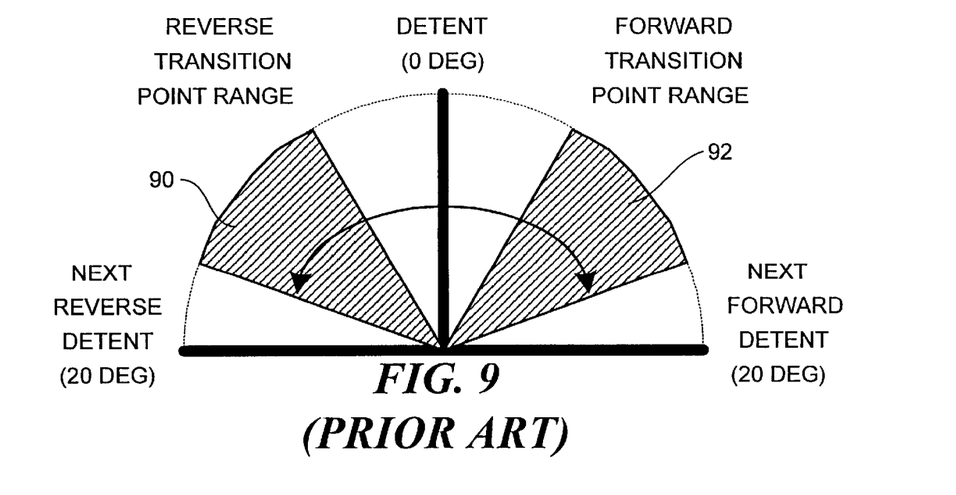
FIG. 9 is a diagram specifying an allowable angular range for the reporting of a transition point between detents.

Furthermore, in the prior art design, the location of some of the components may change over time, due to creep and/or wear. For example, the leaf spring constantly applies a lateral force to the support bracket, which eventually may cause the location of the bearing to creep, i.e., shift relative to the rest of the case. As a result, the location of the codewheel relative to the light emitter and photodetector may shift, causing the transition point to shift as well. Another problem occurs as a result of wear on the contacting surfaces and/or fatigue in the leaf spring. As a result, the mechanical accuracy of the detent positions relative to the encoder signal output in a given assembly may change over time. In consideration of these and other problems related to accurately detecting transitions as the encoder wheel is rotated, acceptable angular ranges 90 and 92 shown in FIG. 9 have been specified for the occurrence of a transition point relative to the adjacent detent positions.

Another problem with the prior art design is that the metal in the leaf spring and coil spring can provide a conduit for an electrostatic discharge (ESD) to susceptible internal components, which may adversely affect the electrical components of the pointing device or of the computer to which the device is coupled.

It would therefore be desirable to provide a detented optical encoder control device that avoids the problems of the prior art devices discussed above. Such a device should eliminate or minimize the effects of bounce back, should avoid using component that can cause ESD, and should enable components to be used for the device that are of acceptably low cost and do not require unreasonably tight tolerances or require costly assembly procedures.

SUMMARY OF THE INVENTION

The invention provides a solution to the foregoing problems by replacing much of the prior art assembly with a single spring biased member, which is referred to herein as an "opto spacer." The opto spacer includes means for locating the light emitter and photodetector (i.e., phototransistors) relative to detent positions of the codewheel such that the output signal from the photodetector that is indicative of the detent positions is much more consistent. Furthermore, the opto spacer, which is preferably made from a plastic, carries out the functions of both the metal leaf spring and metal coil spring used in the prior art design, thereby removing two potential sources of ESD.

According to a first aspect of the invention, a detented encoder suitable for use in a computer input device such as a mouse is provided comprising conventional optical encoder components including a light source (preferably an LED with appropriate lens), a light sensor (i.e., photodetector), and a codewheel. The light source directs light at the light sensor, which preferably comprises a pair of phototransistors or photodiodes. The codewheel includes a plurality of radially-extending, evenly spaced-apart teeth that define slots, and the codewheel is positioned such the teeth and slots are disposed between the light source and light sensor. Upon rotation of the codewheel, the teeth interrupt the light from the light source reaching the light sensor. The codewheel is mounted on a shaft (or preferably the shaft and codewheel are formed as an integral part) that includes a portion having a plurality of longitudinally extending slots defined in a surface thereof. Mounted to the shaft is the wheel that is turned by a user. The shaft is supported at one end by a bearing surface defined in a support bracket that is coupled to a support member.

A key component of the invention is the opto spacer, which is preferably made of plastic and operatively coupled to the support member, preferably by being mounted to a printed circuit board (PCB), which in turn is mounted to the support member. The opto spacer is preferably mounted to the PCB by legs that engage holes defined in the PCB and includes a base portion that provides an alignment hole mated with an alignment pin extending from the support member through the PCB so as to locate the opto spacer relative to the support member. The base portion of the opto spacer also preferably includes alignment holes for locating the light source and light sensor.

The opto spacer further comprises a cantilever portion connected to the base portion by a pair of elastomeric arms, thereby enabling the cantilever portion to apply a biasing force against the shaft when the arms are flexed. The cantilever portion comprises a U-shaped opening that is sized to receive the splined portion of the shaft and includes a protrusion disposed generally in its center. The protrusion engages a spline in the splined portion of the shaft. The biasing force exerted by the cantilever portion through the protrusion provides a pre-load against the splined portion of the shaft such that when the shaft is rotated by the wheel, the cantilever portion flexes as the protrusion moves in and out of spline wells defined between adjacent spline teeth, thereby producing a detent action that defines a plurality of detent positions at equally-spaced angles of rotation corresponding to the plurality of spline teeth in the splined portion of the shaft. The cantilever portion of the opto spacer may further comprise a pair of bearing surfaces located on the far side of the opening that bear against an adjacent surface on the front side of the support bracket such that when the cantilever portion is caused to flex by the detent action, the movement of the cantilever portion is in a direction substantially transverse to the longitudinal axis of the shaft.

The detented encoder further preferably comprises a slotted bracket connected to the support member that includes a slot sized to receive the free end of the shaft and to control a lateral displacement of the free end of the shaft. The slot in the slotted bracket preferably permits movement of the shaft so as to enable a user to activate a switch located adjacent to the shaft when the user applies a force on the wheel directed toward the switch.

The detented encoder also preferably includes a logic circuit that is used to process a quadrature signal produced by the photodetector. The quadrature signal is processed by the logic device to produce an output signal indicative of the direction and number of detent positions the wheel is turned by the user. A transition between adjacent detents is reported at a point where rotation of the codewheel to the next detent position is certain to occur if the user releases the wheel, thereby substantially avoiding the problems associated with bounce back.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 10:
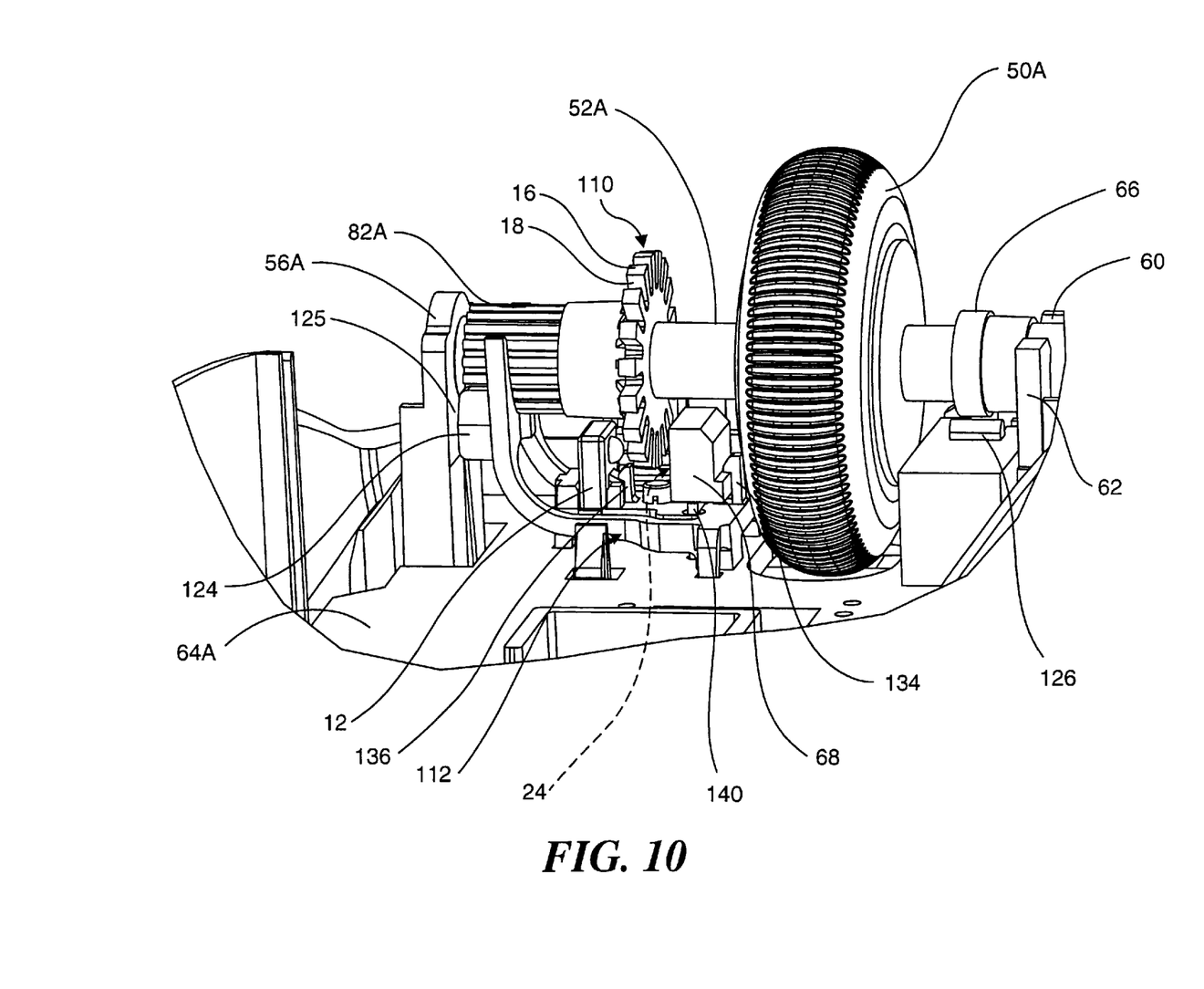
FIG. 10 is a rear isometric view of the detented optical encoder assembly of the present invention.
Figure 11:
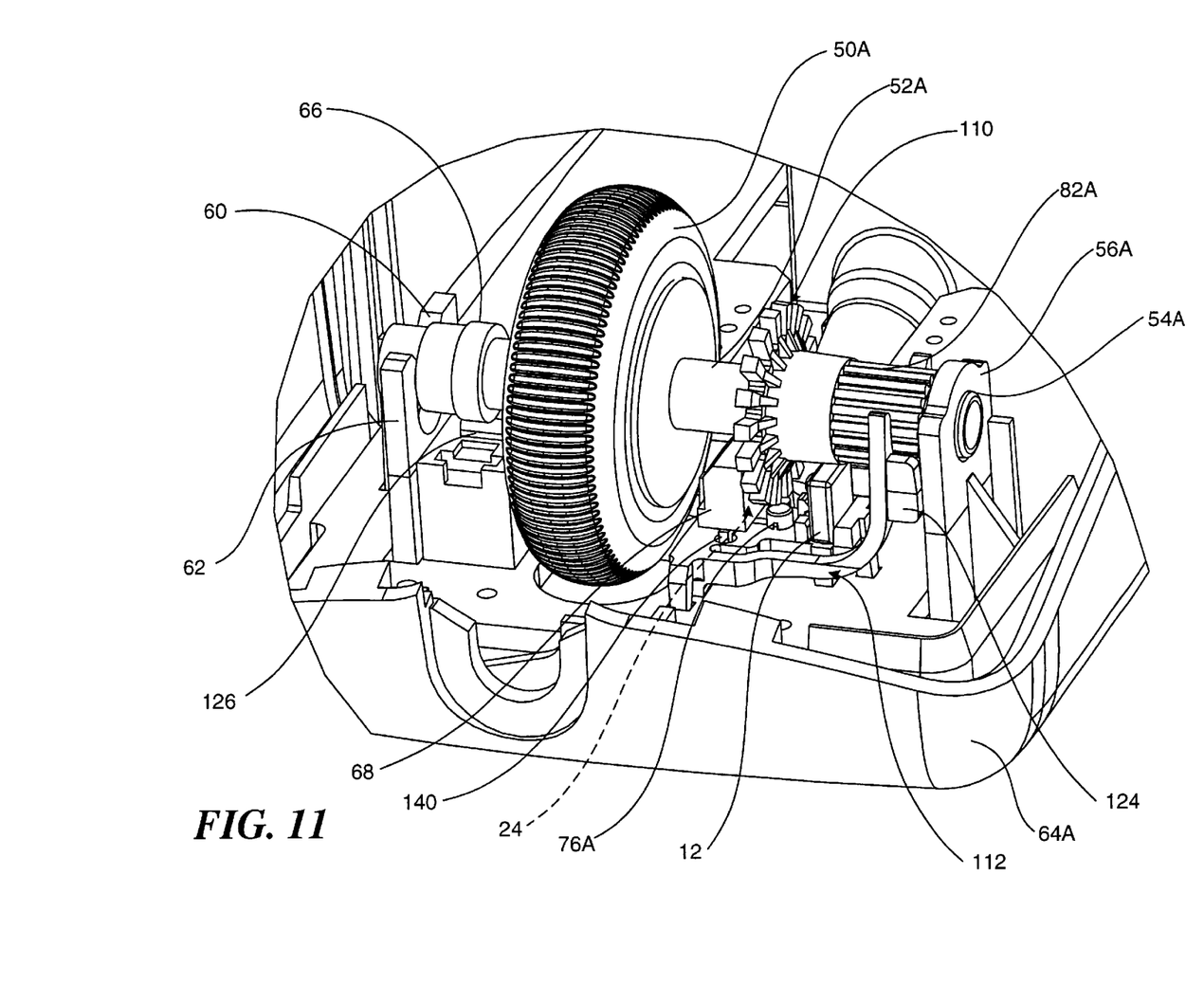
FIG. 11 is a front view of the assembly of FIG. 10.

With reference to FIGS. 10 and 11, it will be apparent that the detented encoder of the present invention includes many of the same components discussed above in connection with the prior art detented wheel/optical encoder assembly of FIG. 6, including slotted bracket 62, light emitter 12 and photodetectors 24. There are also many components common to both assemblies that are substantially similar in purpose, but differ in configuration or in the manner in which they function. These components are identified in the Figures by appending an "A" to each component's reference number, and include a wheel 50A, a shaft 52A, a support bracket 56A, a case 64A, and spline teeth 82A, which extend longitudinally along shaft 52A. A new codewheel 110 has been substituted for codewheel 10 shown in FIGS. 2 and 6.

Figure 12:
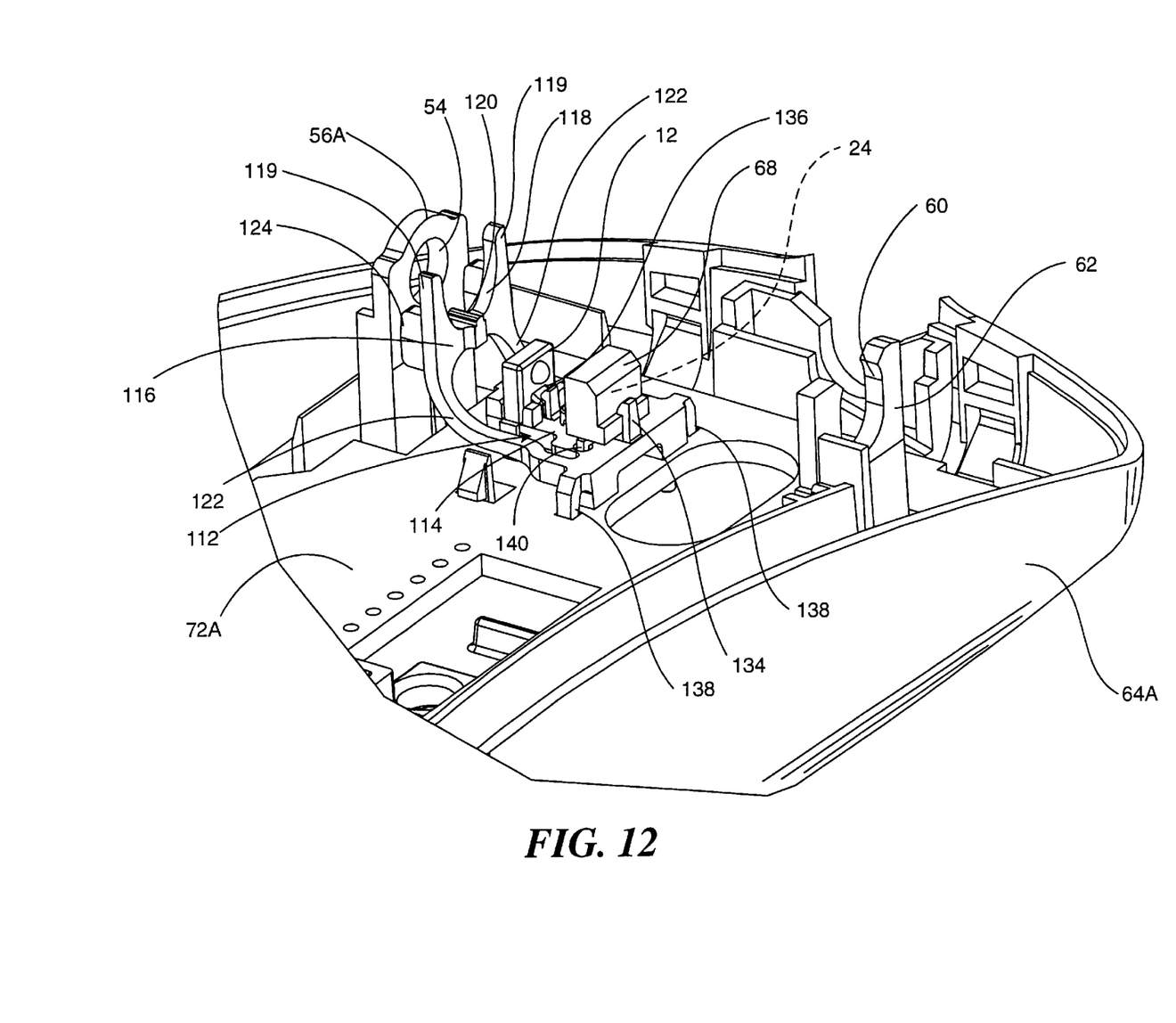
FIG. 12 is a rear isometric view of the assembly of FIG. 10, with the wheel, codewheel, and shaft removed.
Figure 13:
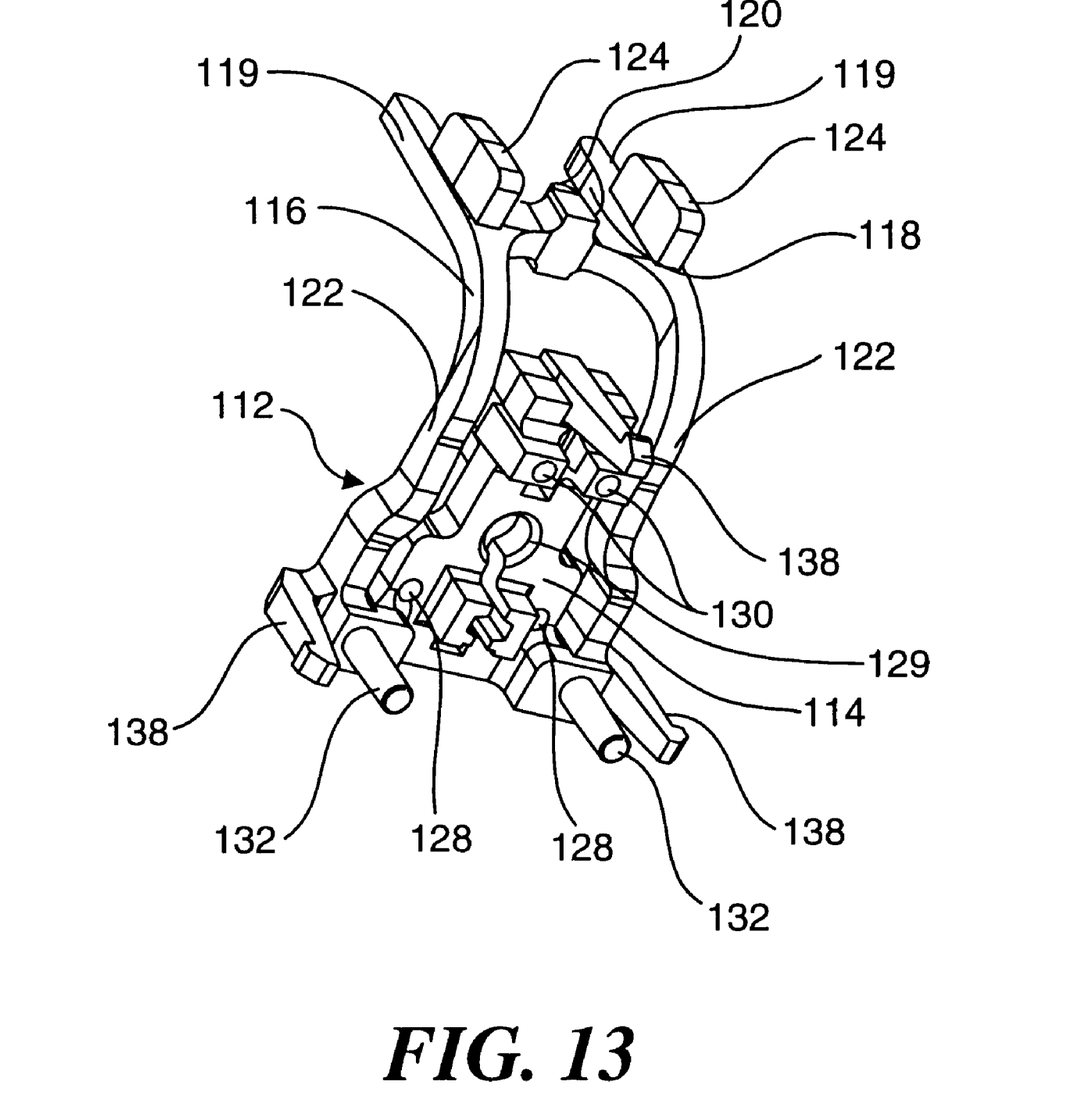
FIG. 13 is a detailed underside isometric view of the opto spacer used in the assembly of FIG. 10.

There are several important differences between the assembly of the present invention shown in FIGS. 10 and 11 and the prior art assembly shown in FIGS. 2 and 6. Notably, the new design of the present invention does not include a metal leaf spring or a coil spring. Both of the functions previously performed by the leaf and coil springs of the prior art design are now provided by a biasing member 112, which is also referred to herein as an opto spacer; further details of the opto spacer are shown in FIGS. 12 and 13. The opto spacer is preferably injection molded with a polycarbonate plastic, and more preferably made of BAYER APEC DP99 351R1510 or an equivalent plastic material. The opto spacer comprises a base portion 114 and a cantilever portion 116. A U-shaped opening 118 defined by upright members 119 is provided in an upper portion of the cantilever portion, and a protrusion 120 is disposed generally in the center of U-shaped opening 118. The cantilever portion additionally comprises a pair of elastomeric arms 122 that extend from base portion 114. Elastomeric arms 122 allow cantilever portion 116 to deflect relative to the base portion in response to the application of a force acting on the cantilever portion.

As shown in FIGS. 10 and 11, the width of U-shaped opening 118 in the opto spacer is sufficient to receive the splined portion of the shaft. Furthermore, the protrusion is designed to engage the spline teeth such that the elastomeric arms are caused to be flexed by a movement of the protrusion (and the entire cantilever portion) as the protrusion moves in and out of successive spline wells defined between adjacent spline teeth when the wheel is turned, thereby creating a detent action. Due to the even spacing of the slots around the circumference of the slotted portion of shaft 52A, the interaction between the protrusion and the spline teeth (and spline wells) creates a plurality of equally-spaced detents as the wheel is turned. These detents are preferably spaced at about 20 degrees apart. Upright members 119 limit lateral movement of the cantilever portion due to the side load imparted through the protrusion as the wheel turns.

It is preferable that an appropriate lubricant (such as a synthetic grease) be applied to the splined portion of the shaft in the vicinity of the protrusion so as to minimize wear as the protrusion slides over the ridges of successive spline teeth 82A. Preferably, the cantilever portion further includes a pair of rubbing blocks 124 disposed on its backside, just adjacent to upright members 119; the spacing between the opto spacer and support bracket 56A is such that the rubbing blocks are in light contact with an adjacent front surface 125 of the support bracket as the cantilever portion moves up and down. The sliding contact between rubbing blocks 124 and front surface 125 constrains the movement of the cantilever portion to be substantially vertical, enabling the protrusion to remain parallel with the spline teeth in the shaft. (It should be noted that as used in this disclosure and in the claims that follow, the directions "vertical," "horizontal," "up," and "down" are all relative to the disposition of the elements shown in the Figures, and these directions are readily changed simply by mounting the components so that they are oriented differently than shown in the drawing Figures. Accordingly, the directions used herein are not intended to be limiting on the scope of this invention.) Preferably, an appropriate lubricant (such as a synthetic grease) is also applied between the rubbing blocks and the adjacent support bracket front surface to reduce wear of these components.

In addition to the foregoing, the opto spacer also serves the purpose previously provided by the coil spring that was used in the prior art design discussed above. The opto spacer applies an upwardly directed force through the protrusion to the shaft that biases the free end of the shaft away from a microswitch 126. Since the elastomeric arms of the cantilever portion can easily flex, a user applying a light downward pressure on the wheel causes shaft 52A to activate microswitch 126. When the downward pressure is released, the elastomeric arms return the free end of the shaft back to its normal position above the microswitch.

With reference to FIG. 13, a plurality of holes defined in the opto spacer for alignment purposes are illustrated, including a case alignment hole 129, detector alignment holes 128, and light emitter alignment holes 130. The opto spacer further includes alignment pins 132, a detector clip 134, a light emitter clip 136, and PCB clips 138. Case alignment hole 129 is disposed to align the opto spacer with an alignment pin 76A (shown in FIG. 11) extending from an inner surface of the lower case. Detector alignment holes 128 receive leads 140 (shown in FIG. 12), which extend from the bottom of the detector housing. Similarly, light emitter alignment holes 130 receive a pair of leads (not shown) extending from the bottom of the light emitter. The detector and light emitter clips engage the detector housing and the light emitter respectively, securing them in place. The alignment pins align the opto spacer with alignment holes provided in the PCB, and the clips mount on the PCB.

The opto spacer design solves many of the problems in the prior art device of FIGS. 2 and 6 discussed above. First, because the opto spacer is a single integral piece, the tolerance stack-up problems associated with the prior art assembly are substantially eliminated. For example, the lateral disposition of the protrusion relative to the location of the alignment holes for the light emitter and photodetectors is very constant in the present invention, with only a very slight (acceptable) variation between lots of parts. Since the inside of U-shaped opening 118 in the cantilever portion, i.e., arms 119, is in rotating contact with the outer surfaces of the ridges between spline teeth 82A on the shaft, the lateral position of the protrusion relative to the shaft remains very constant, and therefore, the lateral position of the protrusion relative to the light emitter and photodetector while in a detent position will be much more consistent from assembly to assembly. The relative position, lateral and angular, between the encoder teeth and the opto pair predominantly depends only on the tolerances within a single part (opto spacer) and very little on the placement of the opto spacer within an assembly. This consistency enables the specified range for the transition angle to be smaller, thereby minimizing the occurrence of bounce back, as discussed below. In addition, the elimination of the metal leaf and coil springs in the present invention eliminates any ESD that was associated with these metal components in the prior art designs.

The opto spacer design provides another advantage by minimizing problems due to creep. Recall that in the prior art design, the metal leaf spring applies a constant side load to the support bracket (through the shaft), which may cause the location of the bearing to creep (be slightly displaced) in a lateral direction over time, thereby causing the position of the shaft (and thus the codewheel) to shift correspondingly. While the cantilever portion of the opto spacer likewise applies a constant load to the support bracket (through the shaft), this load is applied vertically. Furthermore, the load on the bearing in the opto spacer design of the present invention is about half that of the prior art design. Finally, any creep caused by this load will have less effect on the accuracy of the reporting of transition points relative to detent positions because the shaft and codewheel are displaced vertically, rather than laterally.

A further advantage provided by the opto spacer design of the present invention is that the "feel" of the wheel (i.e., the amount of torque required to move the wheel between detent positions) may be easily adjusted. Such an adjustment is made by simply changing the geometry of the protrusion and/or the geometry of the profile of the spline teeth.

Figure 14:
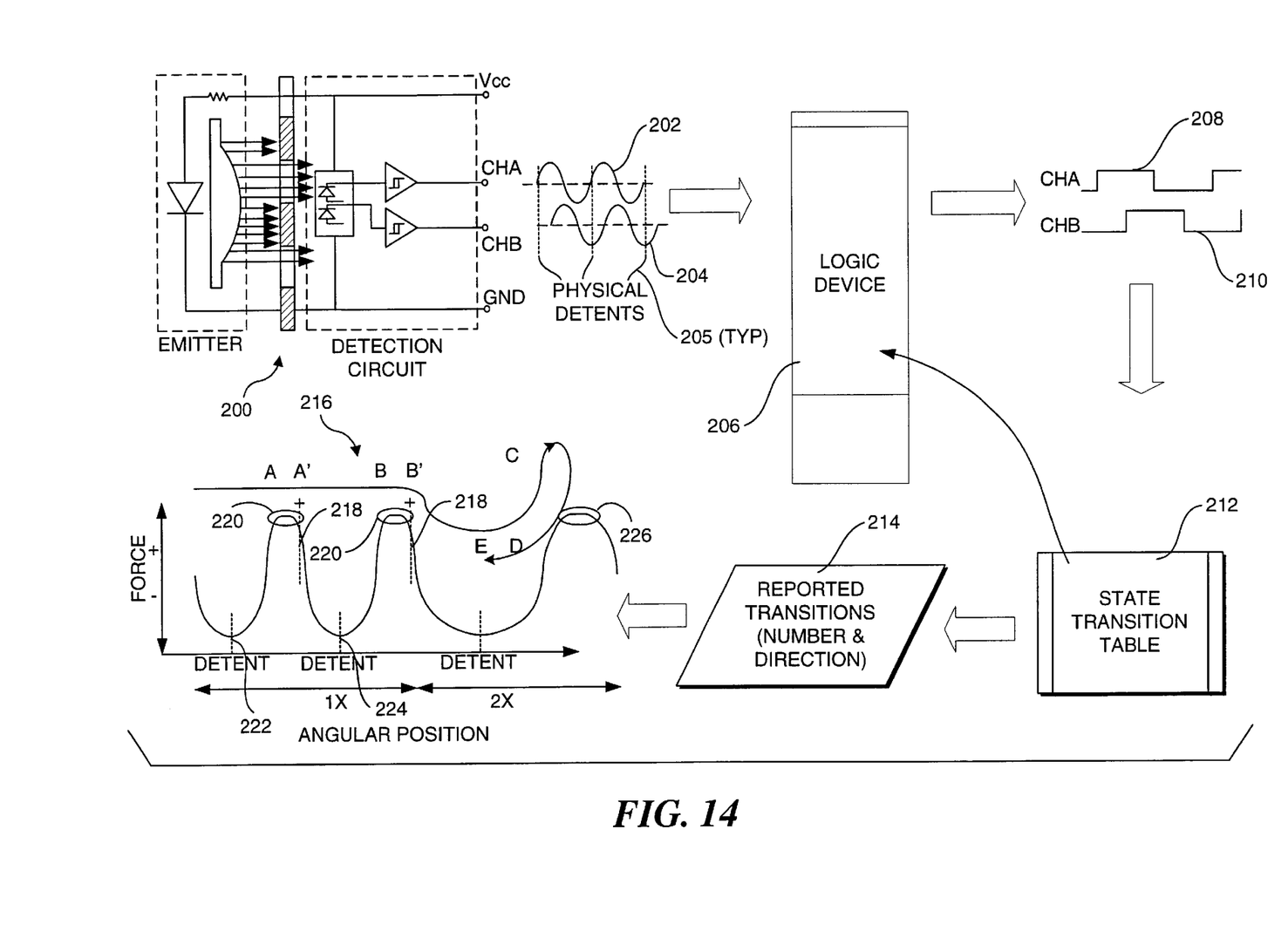
FIG. 14 is a process diagram illustrating how the effect of bounce back is substantially eliminated by the present invention.

With reference to FIG. 14, it will be evident that the detented encoder assembly of the present invention can be combined with specialized signal processing to ensure that the reported transition points between adjacent detents occurs substantially only after the passing of balancing points. The processing starts with the output produced by an optical encoder circuit 200, which is shown in FIGS. 10 and 11 and includes the components discussed above, with reference to FIG. 4. The optical encoder circuit produces a pair of sinusoidal output signals 202 and 204 on respective channels A and B when the wheel (and thus the codewheel) is rotated at a constant rate; the phase angle between channels A and B is approximately 90 degrees. The number of spline teeth 82A in shaft 52A are preferably equal to the number of teeth defined in the codewheel (or an integer multiple thereof) so that the phase angle between the sinusoidal output signals produced on channels A and B remain constant relative to the location of physical detents 205 as the wheel is turned.

A logic device 206 is preprogrammed with logic to process sinusoidal output signals 202 and 204 on channels A and B, producing corresponding square waves 208 and 210, respectively, which comprise a quadrature signal. The logic device further includes a state transition table 212 that includes a plurality of entries defining when transitions in the position of the wheel should be reported based on changes in the logic levels of channels A and B. The logic device uses the transition state table to generate data 214 concerning the present incremental position of the encoder, which are reported within a specified angular range between detents as the wheel is turned by a user. Details of the processing performed by the logic device and the state transition table are disclosed in a commonly assigned copending application entitled, "A METHOD FOR DETERMINING THE POSITION OF A DETENTED OPTICAL ENCODER," Ser. No. , 09/442,592, filed on Nov. 17, 1999, the disclosure of the specification and drawings of which is hereby specifically incorporation herein incorporated by reference.

As discussed above, the opto spacer design results in much higher consistency in the location of the various assembled components on an assembly-by-assembly basis. Furthermore, since the effect of creep is minimized, the angle at which transition points are reported relative to physical detent positions for a given assembly changes very little over time. As a result, it is possible to narrow the specified reported transition point range discussed above in reference to FIG. 9 such that reported transition points substantially only occur after a balance point has been passed as the wheel is turned between adjacent detent positions.

As shown in a force curve 216 of FIG. 14 (similar to the force curve diagram shown in FIG. 7), reported transition points 218 now occur after balance regions 220 have been passed. For example, when moving the wheel forward from a detent 222 to an adjacent detent 224 in the present invention, a "+" count is reported at a position A', in contrast to reporting the "+" count at a position A, as was the case with the prior art design discussed above with reference to FIG. 7. Likewise, a "+" count is reported at position B' when the wheel is turned forward to the next detent. As with the previous description of bounce back, when the wheel is turned from position B to position C the user releases the wheel, but the wheel continues to roll forward due to its angular momentum. At position C, the wheel is moving forward very slowly, but in this case, the logic device does not report a forward count because a balance point 226 has not yet been passed. Just after position C, the wheel stops rotating in the forward direction, changes direction, and returns to the last detent at position E. At position D, the wheel is rolling in the reverse direction, but the logic device again does not report a reverse count, since the encoder wheel did not pass through balance point 226 in the reverse direction. At position E the wheel comes to rest at a detent. Thus, since neither a forward nor a reverse transition (i.e., count) is reported at either of positions C or D, the previous problem with bounce back has been substantially eliminated (or at least minimized—the actual transition point will vary depending on the sensitivity of the optical encoder circuit, so there may be instances where an overlap occurs between allowed transition points and balance points).

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A detented encoder employed for sensing a rotation of a wheel by a user, comprising:
   (a) a rotatable shaft on which the wheel is mounted, said shaft having a splined portion that includes a plurality of evenly-spaced, longitudinally extending spline teeth defined about a surface thereof;

(b) a light source;

(c) a light sensor that produces a signal indicative of an intensity of light received from the light source;

(d) a support having a bearing surface in which the shaft is rotatably mounted;

(e) a biasing member, operatively coupled to the support and including:
   (i) a base portion on which the light source and the light sensor are mounted; and
   (ii) a cantilever portion connected to the base portion and applying a pre-load force against the splined portion of the shaft, said cantilever portion including a protrusion disposed adjacent to the splined portion of the shaft and engaging a spline tooth from among the plurality of spline teeth in the splined portion, the pre-load force provided by the cantilever portion being applied through the protrusion against the splined portion of the shaft such that when the shaft is rotated by the wheel, the cantilever portion flexes as the protrusion moves in and out of spline wells defined between adjacent spline teeth, thereby producing a detent action that defines a plurality of detent positions at equally-spaced angles of rotation corresponding to the plurality of equally-spaced spline teeth; and (f) a codewheel mounted on the shaft and having a plurality of radially-extending, circumferentially spaced-apart teeth between which are defined slots, said teeth passing between the light source and the light sensor when the wheel is turned and rotates the shaft, which rotates the codewheel, said teeth interrupting the light received by the light sensor from the light source so that the signal produced by the light sensor is indicative of the rotation of the wheel.

2. The detented encoder of claim 1, wherein the cantilever portion comprises a pair of elastomeric arms extending from the base portion.

3. The detented encoder of claim 1, wherein the biasing member comprises a plastic.

4. A detented encoder employed for sensing a rotation of a wheel by a user, comprising:

(a) a rotatable shaft having a supported end and a free end, and a splined portion that includes a plurality of evenly-spaced, longitudinally extending spline teeth defined about a surface thereof, said wheel being mounted on the shaft;

(b) a supporting member;

(c) a light source;

(d) a light sensor that produces a signal indicative of an intensity of light received from the light source;

(e) a bracket connected to the supporting member and having a bearing surface defined therein in which the supported end of the shaft is rotatably mounted;

(f) a biasing member, operatively coupled to the supporting member and including:
   (i) a base portion on which the light source and the light sensor are mounted; and
   (ii) a cantilever portion connected to the base portion and applying a biasing force against the splined portion of the shaft, said cantilever portion comprising:
      (1) a U-shaped opening adapted to receive the splined portion of the shaft; and
      (2) a protrusion disposed generally in a center of the opening, to engage a spline tooth of the plurality of spline teeth in the splined portion of the shaft, the cantilever portion providing the biasing force through the protrusion as a pre-load against the splined portion of the shaft such that when the shaft is rotated by the wheel, the cantilever portion flexes as the protrusion moves in and out of spline wells defined between adjacent spline teeth, thereby producing a detent action that defines a plurality of detent positions at equally-spaced angles of rotation corresponding to the equally spaced-apart spline teeth; and (g) a codewheel mounted on the shaft and having a plurality of radially-extending, circumferentially spaced-apart teeth between which are defined slots, said teeth passing between the light source and the light sensor when the wheel is turned, rotating the shaft, which rotates the codewheel, said teeth interrupting the light received by the light sensor from the light source so that the signal produced by the light sensor is indicative of the rotation of the wheel.

5. The detented encoder of claim 4, wherein the cantilever portion comprises a pair of elastomeric arms extending from the base portion.

6. The detented encoder of claim 4, wherein the biasing member comprises a plastic.

7. The detented encoder of claim 4, further comprising a slotted bracket connected to the supporting member and having defined therein a slot that receives the free end of the shaft, said slot controlling a lateral displacement of the free end of the shaft.

8. The detented encoder of claim 7, further comprising a switch disposed adjacent to the shaft, wherein the slot in the slotted bracket allows the shaft to be displaced so as to activate the switch upon application of a force on the wheel in a direction aligned with the slot in the slotted bracket.

9. The detented encoder of claim 4, wherein the supporting member includes a locating pin, and the base portion of the biasing member includes a location hole that receives the locating pin to control a disposition of the biasing member relative to the supporting member.

10. The detented encoder of claim 4, wherein the base portion of the biasing member defines a plurality of locating holes for mounting the light source and the light sensor, such that a disposition of the light source relative to the light sensor, and a disposition of the light source and the light sensor relative to the biasing member is controlled.

11. The detented encoder of claim 4, wherein the base portion of the biasing member includes a clip for retaining the light source.

12. The detented encoder of claim 4, wherein the base portion of the biasing member includes a clip for retaining the light sensor.

13. The detented encoder of claim 4, further comprising a printed circuit board mounted to the supporting member, wherein the biasing member includes at least one leg received in a respective hole in the printed circuit board to mount the biasing member onto the circuit board.

14. The detented encoder of claim 4, wherein the cantilever portion of the biasing member comprises a bearing surface disposed adjacent to the bracket, the bearing surface acting against the bracket when the cantilever portion is caused to flex by the detent action, to limit a movement of the cantilever portion in a direction substantially transverse to a longitudinal axis of the shaft.

15. The detented encoder of claim 4, wherein the light sensor comprises a pair of photodetectors that are spaced apart at a distance based on a width of the slots in the codewheel such that the light sensor produces a quadrature output when the wheel is turned.

16. The detented encoder of claim 15, wherein the light source comprises a light emitting diode and the photodetectors each comprise a phototransistor.

17. The detented encoder of claim 15, further comprising a logic device that processes the quadrature output to produce data indicative of a detent position when the wheel is turned.

18. A detented encoder employed in a pointing device, for sensing a detent position of a wheel when the wheel is turned by a user, comprising:

(a) a horizontally-disposed rotatable shaft having a supported end, a free end, and a splined portion that includes a plurality of evenly-spaced, longitudinally extending spline teeth defined about a surface thereof, said wheel being mounted on the shaft;

(b) a support member;

(c) a light source;

(d) a photodetection circuit comprising a pair of light sensors, each light sensor of said pair producing a signal indicative of an intensity of light received from the light source by that light sensor;

(e) a logic device coupled to the photodetection circuit;

(f) a bracket connected to the support member and having a bearing surface defined therein to rotatably mount the supported end of the shaft;

(g) a slotted bracket connecting to the support member and having defined therein a slot that receives the free end of the shaft, said slot controlling a lateral displacement of the free end of the shaft;

(h) a biasing member, operatively coupled to the support member and including:

(i) a base portion on which the light source and the light sensors are mounted; and (ii) a cantilever portion connected to the base portion and applying a biasing force against the splined portion of the shaft, said cantilever portion comprising:

(1) a U-shaped opening adapted to receive the splined portion of the shaft; and (2) a protrusion disposed generally in a center of said opening, to engage a spline tooth from among the plurality of spline teeth in the splined portion of the shaft, the cantilever portion being sufficiently elastomerically displaced to provide a vertical pre-load through the protrusion against the splined portion of the shaft such that when the shaft is rotated by the wheel, the cantilever portion flexes as the protrusion moves in and out of spline wells defined between adjacent spline teeth, thereby producing a detent action that defines a plurality of detent positions at equally-spaced angles of rotation; and (i) a codewheel mounted on the shaft and having a plurality of radially-extending teeth between which are defined slots, said teeth passing between the light source and the light sensors as the rotation of the wheel rotates the shaft, which rotates the codewheel, said teeth interrupting the light received by the light sensors from the light source so that signals produced by the photodetection circuit and processed by the logic device to produce a quadrature signal are indicative of the detent position of the wheel when the wheel is turned by the user.

19. The detented encoder of claim 18, further comprising a switch disposed under the shaft, wherein the slot in the slotted bracket allows the shaft to be vertically displaced so as to activate the switch upon application of a downward force on the wheel by the user.

20. The detented encoder of claim 18, wherein the pointing device one of a mouse and a trackball.

* * * * *